Jan. 8, 1952    R. H. ALEXANDER ET AL    2,581,898
RECEPTACLE FILLING MECHANISM
Filed March 25, 1948    3 Sheets-Sheet 1
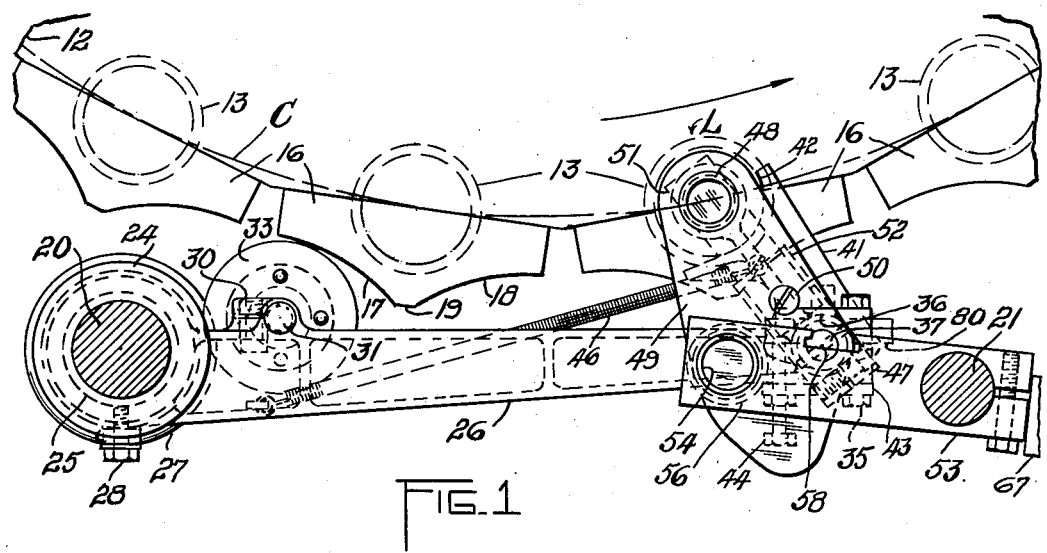
FIG. 1
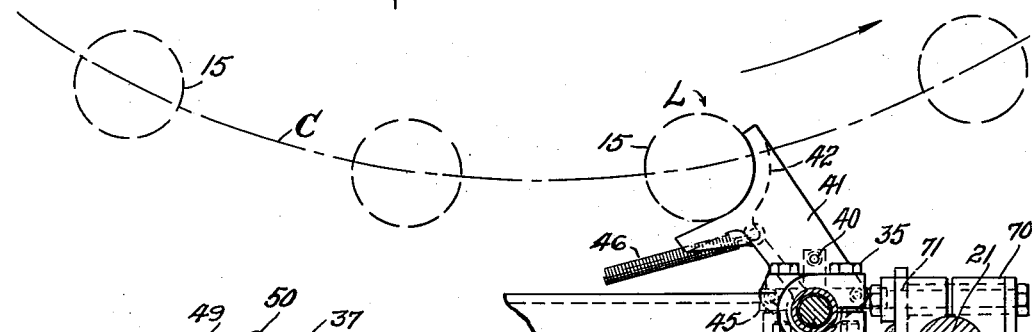
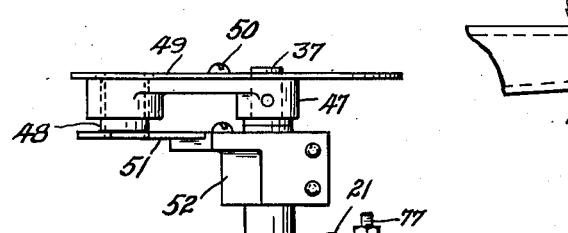
FIG. 3
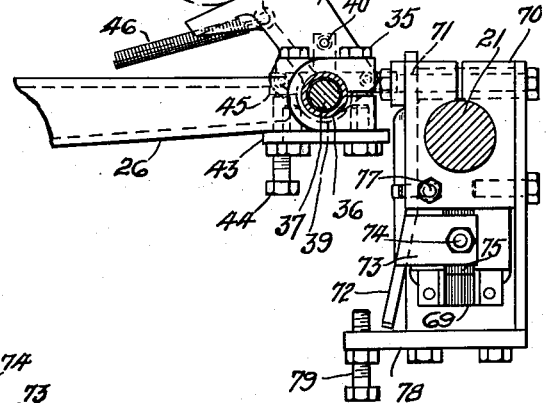
FIG. 4
INVENTORS.
Curtis Spicer and
BY Robert H. Alexander
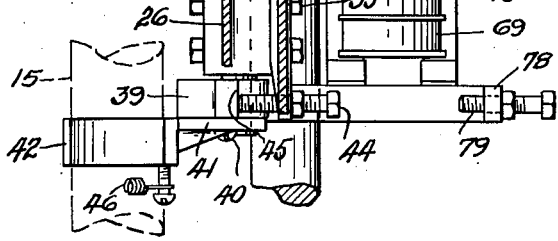
Attorney Jan. 8, 1952     R. H. ALEXANDER ET AL     2,581,898
RECEPTACLE FILLING MECHANISM
Filed March 25, 1948     3 Sheets-Sheet 2
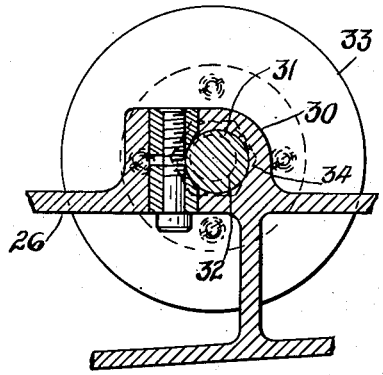
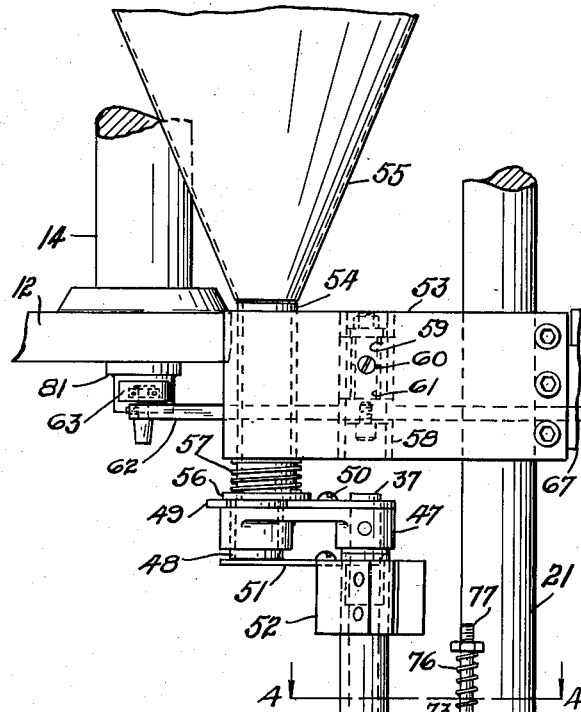
INVENTORS.
Curtis Spicer and
BY Robert H. Alexander
Attorney

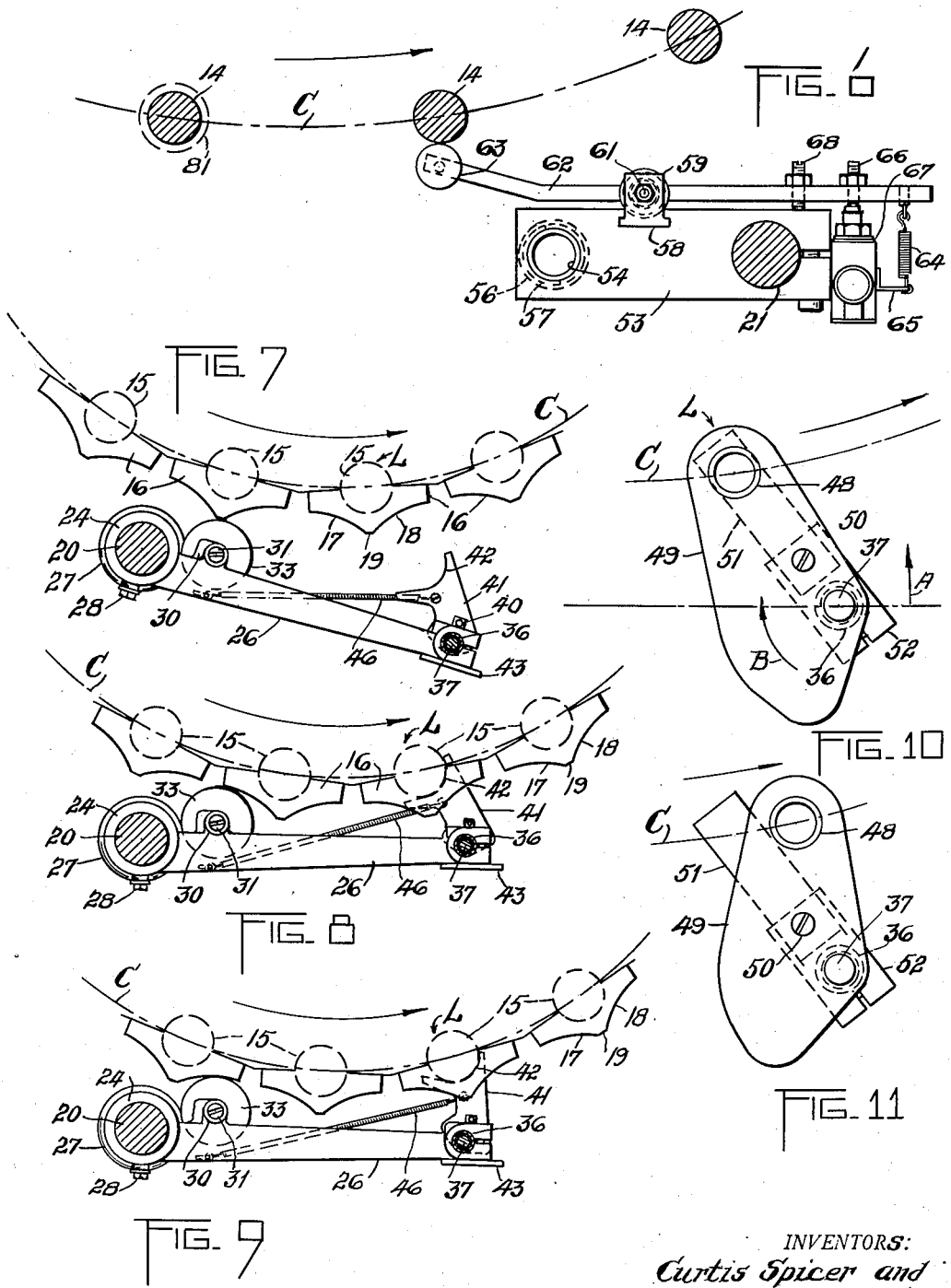

Patented Jan. 8, 1952

2,581,898

UNITED STATES PATENT OFFICE 2,581,898

RECEPTACLE FILLING MECHANISM

Robert H. Alexander and Curtis Spicer, Warren, Pa., assignors to Sylvania Electric Products, Inc., a corporation of Massachusetts Application March 25, 1948, Serial No. 17,004

11 Claims. (Cl. 18—30)

The present invention relates generally to receptacle filling mechanisms and more particularly to devices for feeding individual charges of molding powder into successive mold cavities of a continuously moving or non-indexing rotary molding press.

Feeding mechanisms, as heretofore constructed for presses of the character described, have usually embodied a reciprocating means for carrying measured charges, individually, from a loading to an unloading position, in a direction transverse to the rotary movement of the press. From the latter position the material was permitted to drop, by gravity, into a moving mold cavity. With the molds arranged closely adjacent one another, and the press operating at a speed necessary for quantity production, this type of feed requires an almost instantaneous discharge of the material. This has been almost impossible to accomplish for a number of reasons. In some instances the bulk factor of materials used will vary and if it is too large, the allotted filling time may be too short. The molding material may spill over the cavity edges, and there may be an escape of powder dust to the atmosphere causing unpleasant working conditions for the press operator. Furthermore, a loss of molding powder is likely to cause imperfections in the molded product.

An object of the present invention is to overcome the aforementioned disadvantages of previously known loading devices, while at the same time the same general type of transverse reciprocating feed heretofore used, is employed.

Another object is the construction of a feeding mechanism substantially controlled by the continuous rotary movement of the press.

A further object of the present invention is to provide a feed system in which the material carrier has a three-path movement, and in which the intermediate path movement follows the circular path of mold travel in registry with the cavity to be filled.

Another object is the provision of means whereby, in the event of a work piece failing to strip from the mold member acting to withdraw it from the cavity, the feeding mechanism will be automatically locked against refilling the cavity.

And, a still further object of the invention is the provision of an improved feeding mechanism in which many parts, used in previous devices of a like general construction, will be eliminated.

An illustrative example of the present invention contemplates the provision of an arrangement for receiving a measured charge of material from a dispensing container, the received charge being carried in a transfer container which is moved into the path of individual molding cavities or other receptacles to be filled, carried near the periphery of a continuously moving table. The transfer container is coupled in alignment with the receiving cavity or other receptacle to be filled and is constrained to move in a path exactly similar to that travelled by the receiving cavity. While thus travelling along with the receiving cavity, the transfer receptacle is caused to discharge into the receiving cavity. The transfer receptacle is thereafter returned to its original relationship with the charge dispensing container to receive another charge for delivery to the next succeeding receiving cavity. As the mold table continues its movement, the filled mold cavities are first subjected to heat and pressure to form the charge as desired, and thereafter the finished article ejected from the mold. Means are provided for detecting a failure of the ejecting operation and in response to such failure, the movement of the transfer receptacle is prevented.

The particular arrangement of the molding table for rotary or other movement, as well as the details of the molding cycle, form no part of the present invention and will be described in the following detailed description only to the extent necessary for an understanding of the present invention.

The accompanying drawings illustrating the invention and forming a part of the specification are as follows:

Fig. 1 is a plan view of the feeding mechanism and adjacent portions of a press with which it is adapted to operate, such mechanism being shown in its inner or cavity loading position.

Fig. 2 is a view in front elevation of the feeding mechanism as at Fig. 1, but showing the supply hopper and also certain control devices which will also be described.

Fig. 3 is a section on line 3—3 of Fig. 2 with parts removed that are above the charge carrying surface plate.

Fig. 4 is a section on line 4—4 of Fig. 2 but showing the outer portion only of the cam actuated arm and, in broken lines, a succession of rams which, in location on the press, are coaxial with corresponding mold cavities similarly shown in Fig. 1.

Fig. 4A is a transverse sectional detail on line 4a—4a of Fig. 2.

Fig. 5 is a view from the underside of the ram engaging member and its pivotal connection to the cam actuated arm, this view also showing in dotted lines the locking lever in operative position.

Fig. 6 is a plan view of the powder feed lockout switch assembly and associated parts.

Figs. 7, 8 and 9 are illustrations in plan view of the cam actuated arm and its ram engaging member in successive positions and a succession of arm actuating cams, the rams being indicated in broken lines.

Figs. 10 and 11 show in plan view the relatively movable charge carrying surface plate and gate associated therewith when the cam actuated arm is in the positions shown in Figs. 8 and 9, respectively.

In the drawings similar reference numerals refer to similar parts throughout the several views.

The illustrated embodiment of the invention shows it as applied to a rotary type of press of known construction and operation, such a press including a fixed frame and a non-indexing or continuously revolving turret. Adjacent the periphery of the turret, indicated at 12, Fig. 1, in a circle concentric therewith, as represented by dot-and-dash line C in Figs. 1, 2 and 6 to 11 inclusive, are a plurality of regularly spaced separable molds. Each mold includes an upwardly opening axially movable cavity 13 adapted to receive a measured amount of raw plastic material when traversing a loading zone, a mating part or "force" 14, three successive ones of the latter being shown in cross section in Fig. 6, and a ram 15 extending downward from the cavity, the three parts being in axial alignment.

The rams 15 are reciprocated by suitable mechanical or hydraulic means, not shown, the function of which is to close the molds after loading, keep them closed under pressure throughout the curing process during which heat is applied, and to open the molds as they successively approach an unloading zone near the completion of the turret cycle so that removal of the work pieces may be effected and the cavities left open for receiving another charge. This operating cycle of rams 15 is conventional and need not, therefore, be further described.

On the outer side wall of the turret, in a horizontal plane below that of the cavities 13, are a plurality of cam blocks 16 each having a pair of like cam surfaces 17 and 18 diverging from a centrally disposed high spot 19, the median line of which is coincident with a radial line passing through the most closely adjacent mold.

In the several views L indicates the mold in the loading zone whether the mold part shown in any particular figure is one or another of the parts 13, 14 or 15.

The frame of the press includes two fixed vertical shafts 20 and 21 arranged one each side of the loading zone. Journalled on shaft 20, between a lower collar 22 fixed to the shaft by set screws 23 and an upper collar 24, (Fig. 2) is an extended sleeve portion 25 on the inner end of a horizontally disposed cam actuated arm 26. A helical spring 27 encircles the sleeve portion 25 and is anchored thereto at one end by a screw 28. At its other end spring 27 is secured to a screw 29 in the fixed collar 22. Adjacent its pivoted end, arm 26 carries a vertically extending bearing 30, in which is clamped a shouldered stud 31. The lower end 32, of stud 31, on which a roller 33 is mounted, is eccentric with respect to the remainder of the stud, as shown in Fig. 4A, and threaded part way to receive a retaining nut 34. This eccentric mounting permits a relative adjustment of the roller 33 with respect to the cam surfaces 17, 18 of blocks 16, which the roller engages.

The outer end of arm 26 forms a split bearing in which is clamped by screws 35 the lower end of a vertically extending tubular shaft 36. Rotatable in shaft 36 is a shaft 37, which extends there-beyond at both its ends, but is held against relative axial movement. Secured to the projecting lower end of the inner shaft 37, by pin 38, is a collar 39. To the under face of the collar is secured the inner end of an arm 41 by means of screws 40. Arm 41, at its outer end, is formed with a depending flange or skirt 42 having an arcuate portion of substantially 90 degrees, terminating in a tangential portion at the median longitudinal line of the arm. The radius of the arcuate portion is such as to closely engage a ram 15, whereby arm 41 may be smoothly rotated by the motion of the ram without relative shake.

Clamping screws 35 are also employed as means for securing a stop plate 43 to arm 26, this plate having a portion projecting below the arm carrying an adjustable stop screw 44 adapted to abut a lateral shoulder 45 on collar 39. A coiled tension spring 46 is anchored at one end to a pin on arm 41 and at its other end to a projection from arm 26. Arms 26 and 41 are thereby normally held in the relative angular position in which they are seen in Figs. 1, 2, 5, 7 and 8 with the screw 44 in abutment with shoulder 45. This angular relation is adjustable by screw 44 and is such that, when cam actuated arm 26 is swung to its inner position by spring 27, the arcuate portion of flange 42 will be concentric with and in wiping engagement against ram 15 of the cavity 13 at loading position L.

Pinned to the extended upper end of inner shaft 37 in substantially the same angular relation as wiper arm 41 is another arm or bracket 47. The outer end of arm 47 is formed to provide a bearing for a removable bushing 48 which constitutes a measuring cup or transfer container whereby the exact amount of powder that is required to fill a cavity 13 is transported from a supply source to said cavity. A surface plate 49 rests upon the upper face of arm 47 and is secured thereto by suitable means, as a screw 50. This plate 49 is of irregular contour, as shown in Figs. 1, 10 and 11, for a purpose later to be set forth. It is provided with an aperture to receive the shouldered upper end of bushing 48, the top of which is flush with the top surface of the plate. The bottom of the bushing is normally closed by a gate 51 comprising a flat strip slightly wider than the inner diameter of the bushing. Gate 51 is seated in a channel in the top face of a bracket 52 clamped to the upper end of tubular shaft 36.

Secured to frame shaft 21 is a bracket 53 having adjacent its free end a vertical bore in which an elongated feed bushing 54 has a sliding fit. Opening into the upper end of bushing 54 is the discharge end of a material supply hopper 55. The lower end of feed bushing 54 is shouldered at 56. Interposed between shoulder 56 and bracket 53 is a coiled compression spring 57 which yieldingly holds the bushing 54 in contact with surface plate 49.

The rear side face of bracket 53 has a vertically extending T-slot 58 for receiving a T-block 59 held in a predetermined position in the channel by a set screw 60. Fulcrumed intermediate its ends on pivot 61 on block 59 is a lever 62, One end of the lever 62 carries a feeler roller 63, while its other end carries an actuating screw 66. Tension spring 64 connected between lever 62 and a fixed anchor 65 urges lever 62 to a normal position of rest, wherein stop screw 68 rests against bracket 53. Bracket 53 carries a pressure responsive switch 67 so placed that the adjustable screw 66 operates the actuating button for the switch 67.

Switch 67, through circuit connections not shown, controls operation of a solenoid 69 (Fig. 4) carried by a supporting frame 70 clamped to the shaft 21. Fulcrumed at 71 to frame 70 is a lever 72 extending above and transversely of arm 26, this lever having a lateral extension 73 which through stud 74 is linked with solenoid plunger 75. Thus, when the solenoid is energized, the downward throw of lever 72 moves it to a position 72a (Fig. 5) in rear of a portion of stop plate 43 projecting outward from the end of arm 26 so as to lock such arm against inward movement. The locking lever is retracted when the solenoid is deenergized by a compression spring 76 (Fig. 2) encircling the long leg of an L-shaped rod 77 extending upward through and guided in an opening in a crossbar of frame 70, the short leg of rod 70 being hooked in lever 72. Frame 70 also includes a crossbar 78 carrying an adjustable stop screw 79 which engages a lateral shoulder 80 on collar 37 to limit the outward swing of cam actuated arm 26.

Operation

With roller 33 riding the high spot 19 of a cam block 16, arm 26 occupies its outermost position, as illustrated in Fig. 7, at which time, under influence of spring 46, wiper arm 41 is held in the angular position shown, by adjustable stop screw 44. With arm 47 also in its outermost position, transfer container 48 rests directly under feed bushing 54 to receive filling material which drops by gravity from hopper 55. The abutting shouldered ends of the two bushings are held in yielding engagement by spring 57 so as to prevent leakage of powder or dust. Gate 51, at this time, covers the lower end of bushing 48. As roller 33 leaves the high spot of the cam, radially aligned with the mold following the one to be filled, the latter mold, including its axially aligned force 14, cavity 13 and ram 15, move toward loading position L. Arm 26 under influence of spring 27 swings to its inner position as illustrated in Figs. 1, 2 and 8, the cam surface and timing being such that when the mold reaches position L the arcuate portion of flange 42 on arm 41 is concentric and in wiping contact with ram 15 of that mold. The eccentric adjustment of cam follower 33 permits an adjustment with relation to arm 41 so that contact of flange portion 42 and the ram 15 is assured.

The concentric shafts 36 and 37, moving with arm 26, carry the surface plate 49 and gate 51 with them so that simultaneously with the mold to be filled reaching position L, the charge carrying bushing 48 with its bottom still closed by gate 51 is in axial alignment with mold cavity 15. Then, as movement of the turret continues, with arm 26 held inwardly by spring 27 and with spring 46 holding the flange 42 of arm 41 against the ram 15, it will be observed that the ram moving along path C against the pivoted arm 41 effects a partial rotation of inner shaft 37 and an angular throw of surface plate 49. Thus, through the combined action of spring 27 on arm 26, spring 46 on arm 41, and ram 15 acting against arm 41 to rotate shaft 37, plate 49 continues to move inwardly, as permitted by curvature of line C and as indicated by arrow A, Fig. 10. A comparison of Figures 8 and 9 shows how curved flange 42 follows exactly the path C followed by mold L. The transfer container 48, being coaxial with the center of 42, likewise follows the same path. Plate 49 is also given an angular throw, as indicated by arrow B, with the result that bushing 48 follows the curvature of line C, as in Fig. 10, until it moves off the gate 51, as in Fig. 11. Material constituting the charge in bushing 48 drops by gravity into the axially aligned cavity 13 while gate 51 is opened. As the succeeding cam starts moving arm 26 outwardly, arm 41 is disengaged from ram 15, and again swings to engage stop 44. Plate 49 returns bushing 48 to its loading position to be again filled from feed bushing 54. The area of surface plate 49 is such that for all positions of bushing 48 in its three-way travel, except when such bushing is in loading position under feed bushing 54, the plate acts as a closure for the feed bushing. Spring 57 yieldingly holds the feed bushing 54 against plate 49 to prevent leakage of the molding material from within the bushing.

Successive molds are filled by repetition of the foregoing sequence of operations. As both discharging and receiving members are held concentric to each other during that portion of their travel along line C, as represented by the relative positions of movable bushing 48 and stationary gate 51, Figs. 10 and 11, it will readily be understood that with the turret rotating continuously and without reduction of speed, time will be given for the material to drop from one member into the other. Thus, any loss of material due to spilling, such as does occur when concurrent movement of both discharging and receiving members is not provided for, is avoided.

Should a work piece 81, shown in dotted line in Fig. 6, fail to strip from a force 14 as cavity and force separate in approaching position L, it will cause the feeler roller 63 to rotate lever 62 in a counter-clockwise direction. This permits release of microswitch 67 and closure of its contacts to energize solenoid 69. Locking lever 72 is thereby moved into the path of stop plate 43 and the arm 26 held against inward movement, thus preventing a refilling of the mold of which the force carrying the unremoved work piece is a part.

What we claim as our invention is:

1. An arrangement for filling continuously moving receptacles including a transfer container having a position of rest, a dispensing container arranged to fill said transfer container in its position of rest, a mechanism for moving said transfer container to and from its position of rest and into the path of said moving receptacles, and means for coupling said transfer container in coaxial arrangement with one of said receptacles for movement along with said one receptacle and for releasing the charge in said transfer container into said receptacle.

2. A charge transferring arrangement for use with a continuously moving table carrying receptacles to be charged with material from a stationary dispensing container, including a transfer container having a position of rest in connection with such stationary container whereby the transfer container receives a charge from the dispensing container, a mechanism moving said transfer container away from said position of rest along a path intersecting the path of said receptacles, and constraining said transfer container to move along a second path similar to the path of said receptacles in alignment with one of said receptacles, means effective in said second path for releasing said charge into said one receptacle.

3. A charge transferring arrangement for use with a continuously moving table carrying receptacles to be charged with material from a stationary dispensing container, including a transfer container having a position of rest in connection with such stationary container whereby the transfer container receives a charge from the dispensing container, a mechanism moving said transfer container away from said position of rest along a path intersecting the path of said receptacles, and constraining said transfer container to move along a second path similar to the path of said receptacles in alignment with one of said receptacles, means effective in said second path for releasing said charge into said one receptacle, and means for moving said transfer container along a third path to said position of rest.

4. A charge transferring arrangement for use with a continuously moving table carrying receptacles to be charged with material from a stationary dispensing container, including a transfer container having a position of rest in connection with said stationary container whereby said transfer container receives a charge from said dispensing container, means for moving said transfer container away from said position of rest along a path similar to the path of said receptacles and in alignment with one of said receptacles, means effective in said path for releasing said charge into said one receptacle, and means for moving said transfer container along another path to said position of rest.

5. A charge transferring arrangement for use with a continuously rotating table carrying receptacles to be charged with material from a stationary dispensing container along a circular path, including a transfer container having a position of rest in connection with said stationary container whereby the transfer container receives a charge from said dispensing container, a mechanism responsive to movement of said table for moving said dispensing container away from said position of rest along a path intersecting the path of said receptacles, means constraining said transfer container to move along a second circular path concentric to the path of said receptacles and in alignment with one of said receptacles, means effective in said second path for releasing said charge into said one receptacle.

6. A charge transferring arrangement for use with a continuously rotating table carrying receptacles to be charged with material from a stationary dispensing container along a circular path, including a transfer container having a position of rest in connection with said stationary container whereby the transfer container receives a charge from said dispensing container, a mechanism responsive to movement of said table for moving said dispensing container away from said position of rest along a path intersecting the path of said receptacles, means constraining said transfer container to move along a second circular path concentric to the path of said receptacles and in alignment with one of said receptacles, means effective in said second path for releasing said charge into said one receptacle, and means for moving said transfer container along a third path to said position of rest.

7. In combination with a continuous rotary molding press having a rotating table carrying a number of molding cavities and a molding material dispenser, including a transfer container having a position of rest in connection with said material dispenser whereby said transfer container receives a charge from said material dispenser, a mechanism responsive to movement of said table for moving said dispensing container away from said position of rest along a path intersecting the path of said molding cavities, means constraining said transfer container to move along a second circular path concentric to the path of said molding cavities and in alignment with one of said cavities, means effective in said second path for releasing the charge into said one receptacle, and means for moving said transfer container along a third path to said position of rest.

8. In combination with a continuous rotary molding press having a molding material dispenser associated therewith and further having a rotating table carrying a number of molding cavities along a circular path, an arrangement for transferring molding material from said dispenser to said molding cavities including a transfer container having a position of rest in connection with said molding material dispenser whereby said transfer container receives a charge from said dispenser container, a mechanism responsive to movement of said table for moving said dispensing container away from said position of rest along a path intersecting the path of said molding cavity, means for constraining said transfer container to move along a second circular path in concentric alignment with one of said molding cavities, means effective in said second path for releasing the charge into said one cavity, and means for moving said transfer container along a third path to said position of rest.

9. In combination with a continuous rotary molding press having a molding material dispenser and a circular rotatable table carrying a number of molding cavities, said table having a number of cams around its periphery, a pivoted arm arranged to swing about an axis parallel to the axis of rotation of said table, said arm carrying a cam follower adapted to engage said cam, said arm carrying a pivoted member at its extremity, said member carrying a transfer container, said transfer container, in the position of rest of said arm, being in a charge receiving relationship with said dispensing container, mechanism for swinging said arm to bring said transfer container in coaxial alignment with one of said molding cavities, said pivoted member carrying means coupling with said molding cavity to maintain said coaxial alignment for a time, means responsive to said coupling for releasing the charge in said transfer container to said receptacle, said cam serving to return said transfer cavity to its position of rest at the end of said time.

10. In combination with a continuous rotary molding press having a stationary molding material dispenser associated therewith, and further having a rotatable table carrying a number of molding cavities, a charge transferring arrangement including a transfer container having a position of rest in connection with said stationary container whereby said transfer container receives a charge from said molding material dispenser, a mechanism responsive to movement of said table for moving said transfer container away from said position of rest along a path intersecting the path of said molding cavities, means constraining said transfer container to move along a second path concentric to the path of said molding cavities, and in alignment with one of said cavities, means effective in said second path for releasing said charge into said one molding cavity and means for moving said transfer container along a third path to said position of rest.

11. A charge transferring arrangement for use with a rotary molding machine having a continously rotating table carrying an annular series of molds to be charged with material from a stationary dispensing container, including a transfer ring having top and bottom openings, a first plate covering the bottom openings of said ring and movable with said ring, a top plate having an aperture in alignment with said ring, said ring having a position of rest in alignment with an aperture in said molding material dispenser whereby said transfer ring is filled with material from said dispenser, a carrier for said ring for moving said ring away from said position of rest along a path intersecting the path of said molding cavities, said top plate closing the aperture in said dispenser as said ring moves, a linkage for constraining said ring to move along a second path in concentric alignment with one of said molding cavities, movement of said ring along said second path causing said first plate to move away from said ring whereby the molding material carried thereby is released into said one cavity, and means operating on said linkage to move said ring to said position of rest.

ROBERT H. ALEXANDER.
CURTIS SPICER.

REFERENCES CITED

The following references are of record in the file of this patent:

UNITED STATES PATENTS

| Number | Name | Date |
|---|---|---|
| 1,531,559 | Lynch | Mar. 31, 1925 |
| 2,109,391 | Lauck et al. | Feb. 22, 1938 |
| 2,235,222 | Lauterbach | Mar. 18, 1941 |
| 2,307,289 | Moreland | Jan. 5, 1943 |
| 2,507,753 | Blackhurst | May 16, 1950 |